United States Patent [19]

Duncan et al.

[11] Patent Number: 5,055,285

[45] Date of Patent: Oct. 8, 1991

[54] PROCESS FOR THE PRODUCTION OF HIGHLY PURE CONCENTRATED SOLUTIONS OF POTASSIUM HYPOCHLORITE

[75] Inventors: Budd L. Duncan, Athens; William O. Flowers, Englewood, both of Tenn.

[73] Assignee: Olin Corporation, Cheshire, Conn.

[21] Appl. No.: 473,804

[22] Filed: Feb. 1, 1990

[51] Int. Cl.$^5$ ............................................. C01B 11/06
[52] U.S. Cl. .................................. 423/473; 252/187.25
[58] Field of Search .................... 423/473; 252/187.25

[56] References Cited

U.S. PATENT DOCUMENTS

| | | | |
|---|---|---|---|
| 1,748,897 | 2/1930 | Oppe | 423/473 |
| 2,157,558 | 5/1939 | Muskat et al. | 423/474 |
| 2,157,559 | 5/1939 | Muskat et al. | 423/473 |
| 3,498,924 | 3/1970 | Walsh et al. | 252/186.25 |
| 4,146,578 | 3/1979 | Brennan et al. | 423/473 |
| 4,428,918 | 1/1984 | Verlaetan et al. | 423/473 |

FOREIGN PATENT DOCUMENTS

| | | | |
|---|---|---|---|
| 54996 | 6/1982 | European Pat. Off. | 423/473 |
| 2940708 | 4/1981 | Fed. Rep. of Germany | 252/187.25 |
| 581945 | 10/1946 | United Kingdom | 423/473 |

OTHER PUBLICATIONS

P. Pierron, Bull. Soc. Chim. Fr. Mem. (5) 8, 661–670 (1941).

*Primary Examiner*—Michael L. Lewis
*Assistant Examiner*—Brian M. Bolam
*Attorney, Agent, or Firm*—James B. Haglind; Paul Weinstein

[57] ABSTRACT

A process for producing potassium hypochlorite solutions by admixing a hypochlorous acid solution having a concentration of 35 percent or greater by weight of HOCl with an aqueous slurry of potassium hydroxide containing 35 percent by weight or greater of KOH at a temperature below about 45° C. The potassium hypochlorite solution produced has a concentration of at least 25 percent to about 60 percent by weight of KOCl.

13 Claims, No Drawings

PROCESS FOR THE PRODUCTION OF HIGHLY PURE CONCENTRATED SOLUTIONS OF POTASSIUM HYPOCHLORITE

This invention is related to the production of pure concentrated solutions of potassium hypochlorite. More particularly, this invention is related to the production of pure concentrated solutions of potassium hypochlorite from pure concentrated solutions of hypochlorous acid.

Potassium hypochlorite has found application as a component of detergent products, a sanitizing agent and as an industrial oxidizer. Known methods for the manufacture of potassium hypochlorite include the chlorination of potash as represented by equation (1):

$$2KOH + Cl_2 \rightarrow KOCl + KCl + H_2O \qquad (1)$$

or by the reaction of a salt of potash with a hypochlorite salt as illustrated by equation (2):

$$K_2SO_4 + Ca(OCl)_2 \rightarrow 2KOCl + CaSO_4 \qquad (2)$$

Both of these methods produce a solution which is contaminated by impurities which limit the concentration of the potassium hypochlorite solution or which inhibit the stability of the potassium hypochlorite solution. Potassium hypochlorite is available commercially as an aqueous solution containing up to about 15% by weight of potassium hypochlorite. The attempted concentration of these solutions of potassium hypochlorite having high concentrations of potassium chloride or other salts results in substantial decomposition.

The concentration of sodium hypochlorite, lithium hypochlorite, and alkaline earth hypochlorites such as calcium hypochlorite, results in the formation of solid products which can be dried to provide solid hypochlorites having high concentrations of available chlorine.

P. Pierron attempted to prepare solid potassium hypochlorite by reacting potassium hydroxide with a solution of chlorine monoxide in carbon tetrachloride. The reaction mixture was evaporated under vacuum at 40° to 45° C. During concentration, the potassium hypochlorite decomposed and an orange residue was recovered which was identified as a mixture of chlorate, hypochlorite and peroxide.

Thus, up to the present time, it has not been possible to prepare concentrated solutions of potassium hypochlorite directly by the concentration of more dilute hypochlorite solutions. Further, in the case of potassium hypochlorite, solutions above about 20 percent by weight of KOCl have not been available.

Surprisingly, now it has been discovered that concentrated solutions of highly pure potassium hypochlorite can be produced for use in the production of the detergent products, as well as sanitizing and bleaching applications.

It is an object of the present invention to provide a process which substantially reduces the formation of salts such as potassium chloride and thereby increasing the solubility of potassium hypochlorite.

Another object of the present invention is to provide a process for producing concentrated potassium hypochlorite solutions having improved stability. An additional object of the present invention is to provide a process for producing concentrated potassium hypochlorite solutions which reduces the amount of expensive potassium hydroxide required.

A further object of the present invention is to provide a process for producing concentrated potassium hypochlorite solutions which reduces the number of processing steps required.

These and other advantages are accomplished in a process for producing an aqueous solution of potassium hypochlorite which comprises admixing a hypochlorous acid solution having a concentration of 35 percent by weight or greater of HOCl, with an aqueous slurry of potassium hydroxide containing 35 percent by weight or greater of KOH at a temperature below about 45° C.

The novel process of the present invention employs as the starting material a concentrated solution of hypochlorous acid, HOCl. One method of producing high purity concentrated HOCl solutions is that in which gaseous mixtures, having high concentrations of hypochlorous acid vapors and chlorine monoxide gas and controlled amounts of water vapor are produced, for example, by the process described by J. P. Brennan et al in U.S. Pat. No. 4,147,761, which is incorporated in its entirety by reference. The gaseous mixture is then converted to a concentrated hypochlorous acid solution.

The concentrated hypochlorous acid solutions employed as one reactant have a concentration in the range of from about 35 to about 60, and preferably from about 40 to about 55 percent by weight of HOCl. The solution is substantially free of ionic impurities such as chloride ions and alkali metal ions and has low concentrations of dissolved chlorine. For example, concentrations of the chloride ion are less than about 50 parts per million and the alkali metal ion concentration is less than about 50 parts per million. The dissolved chlorine concentration in the hypochlorous acid solution is less than about 2 percent, and preferably less than about 1 percent by weight.

The highly concentrated hypochlorous acid solution has a density, for example, in the range of from about 1.15 to about 1.26, preferably from about 1.17 to about 1.24, and more preferably of from 1.19 to about 1.23 grams per milliliter (gm/ml) at a temperature in the range of from 10° C. to 15° C.

The second reactant in the novel process of the present invention is potassium hydroxide. The potassium hydroxide is employed as an aqueous solution or slurry. The potassium hydroxide employed is, for example, an industrial grade having low concentrations of impurities such as potassium chloride.

In the novel process of the present invention, the hypochlorous acid solution is admixed with the potassium hydroxide to form a reaction mixture which is stirred or agitated to provide a homogeneous reaction mixture. During the process, the temperature of the reaction mixture is maintained at up to about 45° C., for example, those in the range of from about 0° to about 45°, and preferably from about 0° C. to about 25° C. The reaction mixture is monitored for excess alkalinity and when this decreases to about 1 percent, the reaction is terminated.

In a single step process the initial slurry of KOH contains at least 35 percent by weight of KOH, and preferably from about 40 to about 60 percent by weight of KOH. The potassium hypochlorite solution produced has a concentration of at least 25 percent, and preferably 30 percent or greater by weight of KOCl. A concentration of KOCl up to about 40 percent by weight of KOCl can be achieved by this direct hypochlorination of pumpable slurries of KOH. Solutions having higher concentrations of KOCl, for example, up to about 50 percent by weight of KOCl, can be produced in an embodiment in which the KOH concentration is initially in the range of from about 20 to about 50 percent by weight of KOH. During the hypochlorination reaction solid KOH is fed to the reaction mixture. Where a concentration of potassium hypochlorite above about 50 percent by weight is desired, the solutions may be concentrated, for example, by evaporation at sub-atmospheric pressures at temperatures of up to 45°–50° C. Preferably in the range of from about 0° to about 45° C. Suitable pressures are those below the vapor pressure of water in the solution at the evaporation temperature. Thus the novel process of the invention is able to produce potassium hypochlorite solutions having KOCl concentrations in the range of from about 25 to about 60 percent by weight.

The product solutions may contain small amounts of solid impurities which are formed during the reaction. These impurities can be removed by any suitable solid-liquid separation method such as filtration. The clear potassium hypochlorite solutions produced are highly pure. These solutions may be used directly in the production of detergent products or the sanitizing of water, etc. The concentrated solutions produced by the novel process of the present invention are surprisingly stable, undergoing only slight losses of available chlorine concentration when stored, for example, at 0° C. Storage temperatures below that of 0° C. may be preferred as it has been discovered that solutions of KOCl with a concentration in excess of 58% by weight may be cooled to temperatures below −20° C. without formation of a solid phase. Thus low temperatures may facilitate the storage and shipment of these very highly concentrated and pure solutions of KOCl. Thus the novel process of the present invention produces clear aqueous solutions of potassium hypochlorite having available chlorine concentrations which have not been previously attained by the processes available.

Further, these highly concentrated solutions are novel sanitizing and bleaching agents which have not previously been available.

To further illustrate the invention the following examples are provided without any intention of being limited thereby. All parts and percentages are by weight unless otherwise specified.

EXAMPLE 1

To an aqueous slurry containing 49% by weight of KOH was continuously added a hypochlorous acid solution containing 43% by weight of HOCl in a stirred cooled reactor. During the addition of the hypochlorous acid, the temperature of the reaction mixture was maintained below about 25° C. by cooling. Addition of the hypochlorous acid was continued until an excess of less than 1.5% KOH remained in the solution. The clear solution obtained as the reaction product contained 34.4% KOCl and 1.3% KCl. To this solution solid KOH was added periodically while the hypochlorination was continued to produce a solution containing 47% by weight of KOCl.

EXAMPLE 2

The potassium hypochlorite solution prepared in example 1 was poured into a distillation vessel and distilled at 25° C. under a pressure less than the vapor pressure of water in the solution. When the distillation was stopped, the solution was filtered to remove small amounts of solid materials which had formed during the evaporation. Upon analysis, the solution contained 57.4% by weight of KOCl and 0.62% by weight of KCl. This solution was cooled to a temperature of −20° C. without the formation of a solid hypochlorite compound.

EXAMPLES 3 and 4

Aliquots of the potassium hypochlorite solution prepared in Example 2, were diluted with deionized water to concentrations of 49.2% KOCl and 39.8% KOCl. These solutions were each placed in a sealed container and stored at zero degrees for a period of eight days. Upon analysis, the stored solutions were found to contain 47.5% KOCl and 39.2% KOCl, respectively.

EXAMPLES 5-8

A KOCl solution containing 22.3% by weight of KOCl and 1.8% by weight of KCl was divided into four aliquot portions. Two aliquot portions were diluted with deionized water to give two solutions of potassium hypochlorite each containing 14.8% by weight of KOCl and 1.2% by weight of KCl. The remaining two aliquot portions were diluted with deionized water to give two solutions of potassium hypochlorite each containing and 9.9% by weight of KOCl and 0.9% KCl. The four vessels containing these solutions were sealed. One vessel for each solution concentration was stored for 66 days at 32° C. After storage, the potassium hypochlorite solutions contained 10.36 and 8.40% by weight of KOCl respectively. The second pair of vessels containing each solution was stored for 66 days at 40° C. After storage, the potassium hypochlorite solutions contained 5.37 and 5.49% by weight of KOCl respectively.

COMPARATIVE EXAMPLES A

A slurry containing 19.25% potassium hydroxide was chlorinated with gaseous chlorine until the excess KOH was less than 1.5%. The chlorinated solution contained 14.9% by weight of KOCl and 12.3% KCl. This solution was divided into four equal portions Two of these portions were diluted with deionized water to a KOCl concentration of 9.9%. After sealing the vessels, the storage procedure of Examples 5-8 was followed exactly. The two solutions containing 14.9% and 9.9% by weight of KOCl stored for 66 days at 30° C. were analyzed and found to contain 7.75% by weight of KOCl and 7.42% by weight of KOCl respectively. The two solutions containing 14.9% and 9.9% by weight of KOCl stored for 66 days at 40° C. were found to contain 3.05% by weight of KOCl and 1.72% by weight of KOCl respectively.

The loss of KOCl during storage at 30° C. for 66 days in the solutions produced by the process of the invention was 30% and 15% respectively. In contrast, the loss of KOCl during storage of the solutions of Comparative Examples A and B at 30° C. for 66 days was 48% and 25% respectively. Thus the stability of the solutions produced by the process of the invention is nearly twice that of the solutions prepared by the process of the prior art.

COMPARATIVE EXAMPLE E

A slurry containing 38% by weight of KOH in water was reacted with gaseous chlorine, while maintaining the temperature below 25° C. Immediately upon the addition of chlorine, solids appeared; after approximately one half of the KOH had been reacted with chlorine, the slurry viscosity increased to where no more chlorine could be adsorbed. Sufficient water had to be added such that the effective initial concentration of the KOH was reduced to 28%. The less than 2% by weight. The concentration of the slurry obtained was 17.9% by weight of KOCl and 14.4% by weight of KCl. Excess crystals were removed by filtration and found to represent about 5% of the total weight. The final filtrate analyzed 18% KOCl and 12.9% KCl. This solution represents the maximum concentration of potassium hypochlorite which can be attained by the reaction with gaseous chlorine.

EXAMPLES 9 and 10

The viscosity (centipoise, CP) and density (g/ml) of KOCl solutions prepared by the process of the invention containing 30% by wt. of KOCl and 40% by wt. of KOCl were determined at 0° and about 20° C. The results are given in Table I below:

TABLE I

| VISCOSITIES AND DENSITIES OF CONCENTRATED HYPOCHLORITE SOLUTIONS | | | | |
|---|---|---|---|---|
| Compound | Conc. (Wt. %) | Temp. | Viscosity (CP) | Density (g/ml) |
| KOCl | 40 | 0 | 4.39 | 1.376 |
|  |  | 18 | 2.05 |  |
|  | 30 | 0 | 3 | 1.277 |
|  |  | 22 | 1.41 | 1.273 |

What is claimed is:

1. A process for producing potassium hypochlorite solutions which comprises admixing at a temperature below about 45° C. a hypochlorous acid solution having a concentration of 35 percent or greater by weight of HOCl with an aqueous slurry of potassium hydroxide containing 35 percent by weight or greater of KOH selected to produce a potassium hypochlorite solution containing 30 percent or greater by weight of KOCl.

2. The process of claim 1 in which the potassium hypochlorite solution produced contains from about 40 to about 60 percent by weight of KOCl.

3. The process of claim 1 in which the aqueous slurry of potassium hydroxide contains from about 40 to about 60 percent by weight of KOH.

4. The process of claim 1 in which the potassium hypochlorite solutions are further concentrated by evaporation at sub-atmospheric pressures and temperatures below about 40° C.

5. A continuous process for producing potassium hypochlorite solutions which comprises:
   a) adding a hypochlorous acid solution having a concentration of 35 percent or greater by weight of HOCl to an aqueous solution or slurry of potassium hydroxide;
   b) admixing the hypochlorous acid with the slurry of potassium hydroxide to form a solution of potassium hypochlorite while maintaining the temperature of the reaction mixture in the range of from about 0° to about 45° C.;
   c) adding solid potassium hydroxide to form a potassium hypochlorite solution containing 30 percent or greater by weight of potassium hypochlorite.

6. The process of claim 5 in which the aqueous solution of slurry of potassium hydroxide contains from about 20 to about 50 percent by weight of KOH.

7. The process of claim 5 in which the reaction mixture is maintained at a temperature of from about 0° to about 25° C.

8. The process of claim 5 in which the aqueous slurry of potassium hydroxide contains from about 35 to about 50 percent by weight of KOH.

9. The process of claim 5 in which the potassium hypochlorite solutions are further concentrated by evaporation at sub-atmospheric pressures and temperatures below about 40° C.

10. The process of claim 9 in which the potassium hypochlorite solutions contain from about 40 to about 60 percent by weight of KOCl.

11. A potassium hypochlorite solution containing from about 30 to about 60 percent by weight of KOCl and having a density in the range of from about 1.27 to about 1.6 g/ml at a temperature of about 0° C.

12. The potassium hypochlorite solution of claim 11 containing from about 40 to about 60 percent by weight of KOCl and having a density in the range of from about 1.37 to about 1.6 g/ml at a temperature of about 0° C.

13. The potassium hypochlorite solution of claim 11 having a viscosity of at least 3 centipoises at 0° C.

* * * * *